United States Patent [19]
Kervagoret

[11] 4,085,657
[45] Apr. 25, 1978

[54] POWER STEERING MECHANISM
[75] Inventor: Gilbert Kervagoret, Argenteuil, France
[73] Assignee: Societe Anonyme D.B.A., Paris, France
[21] Appl. No.: 713,326
[22] Filed: Aug. 11, 1976
[30] Foreign Application Priority Data
  Aug. 21, 1975  France .................................. 75 25863
[51] Int. Cl.² .............................................. F15B 9/10
[52] U.S. Cl. ......................................... 91/380; 91/465
[58] Field of Search ...................... 91/380, 375 A, 368

[56] References Cited
U.S. PATENT DOCUMENTS

| 786,652 | 4/1905 | Larsson | 91/380 |
| 2,685,211 | 8/1954 | Haynes et al. | 91/380 |
| 3,310,284 | 3/1967 | Inaba et al. | 91/380 |

Primary Examiner—Paul E. Maslousky
Attorney, Agent, or Firm—Paul David Schoenle; Ken C. Decker; William N. Antonis

[57] ABSTRACT

A power steering mechanism comprises distributing means for communicating fluid pressure to the compartments of a fluid motor associated with the steering linkage of the vehicle. Each distributing means comprises a ball valve member disposed in a chamber of a housing. The valve member is urged towards a first valve seat defined in a low pressure supply passage, by means of spring means, and towards a second valve seat defined in a high pressure supply passage by means of an extension of an actuating piston, said extension extending through the low pressure passage. The piston is moved by way of a sleeve disposed intermediate between the input and output members and connected thereto by means of a spline and screw arrangement. In response to a torque applied to the input member, the sleeve is allowed to move axially for displacing the piston and modifying the position of the valve member, thereby changing the value of the pressure transmitted to the associated compartment.

9 Claims, 4 Drawing Figures

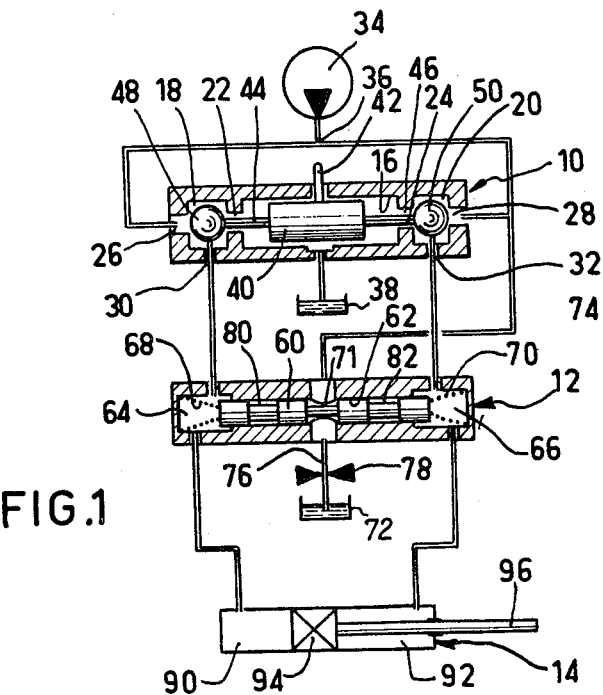
FIG.1
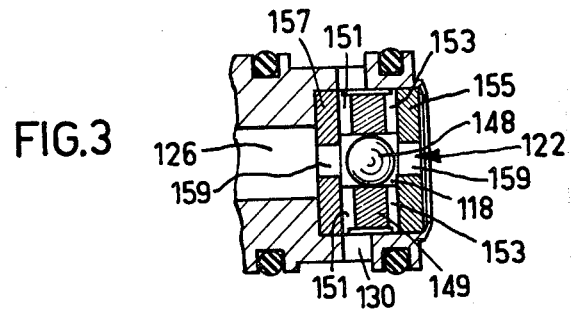
FIG.3
FIG.4
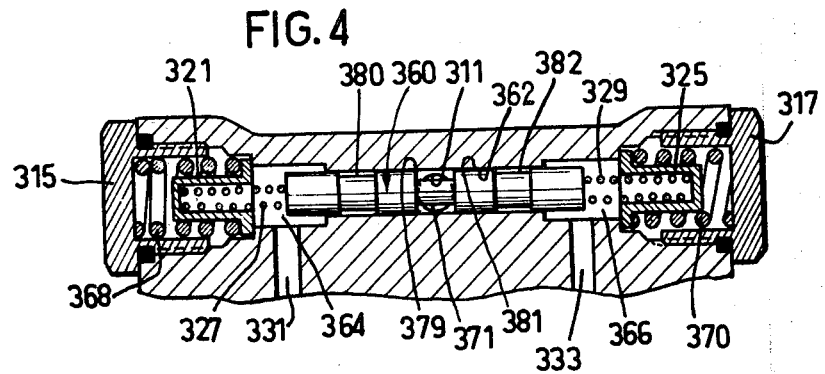

4,085,657

POWER STEERING MECHANISM

The invention relates to a power steering mechanism, more particularly for supplying a force for assisting movement of the steering linkage of a motor vehicle.

A device of this type generally has a fluid motor formed by two compartments separated by a piston. A pressure difference can be applied between the two compartments by means of a distribution valve which is connected to a high pressure source and to a reservoir and which is operated in response to the application of torque to the steering column. The pressure difference to which the fluid motor is subjected is a function of the torque applied to the steering column of the vehicle.

The distribution valve is usually a spool valve or a rotary valve of a conventional type. The valve components are produced by complicated machining processes with manufacturing tolerances of as little as 1 micron, so that their cost price is relatively high.

An object of the invention is to propose a power steering mechanism device wherein control of the distribution of fluid is performed by way of cheaper and less complex devices.

Another object of the invention is to propose a power steering device which is easy to be mounted.

Therefore, the invention proposes a power steering mechanism comprising a housing defining a cavity therebetween, an input member engaged in said cavity and susceptible to be rotated by an operator, an output member also engaged in the cavity and disposed coaxial with the input member, said output member being provided for transmitting to the steering linkage of the vehicle a force applied to the input member, said input and output members being resiliently connected, said power steering mechanism comprising a fluid motor supplied from a fluid pressure source by way of distributing means, to provide a force for assisting operation of the steering linkage in response to rotary motion of the input member, an intermediate sleeve situated in the cavity and coaxial with the input and output members, said sleeve being movable relative to the input and output members along their axis of rotation in response to a rotational operation of the input member, said sleeve being operatively connected in rotation with one of the input and output members, by means of matching splines respectively formed in the sleeve and said one of the input and output members, said splines permitting axial sliding, said sleeve being also screwed into the other of said input and output members so as to enter into rotation therewith, actuating means responsive to axial movement of the sleeve for moving a valve member disposed in a distributing chamber of the distributing means, the position of said valve member determining the pressure of fluid transmitted to the fluid motor chamber associated with said distributing means, said valve member being movable from an idle position corresponding to an idle pressure in the associated chamber of the fluid motor, to increase or decrease the pressure in said chamber according to the direction of the axial motion of said intermediate sleeve.

The invention will now be described by way of example with reference to the accompanying drawings, in which:

FIG. 1 diagrammatically illustrates a power steering mechanism embodying the invention;

FIG. 3 illustrates an embodiment of the valve of the distributor; and

FIG. 4 is a view representing a cross-section of the by-pass valve of the device shown in FIG. 1.

Figure 2:
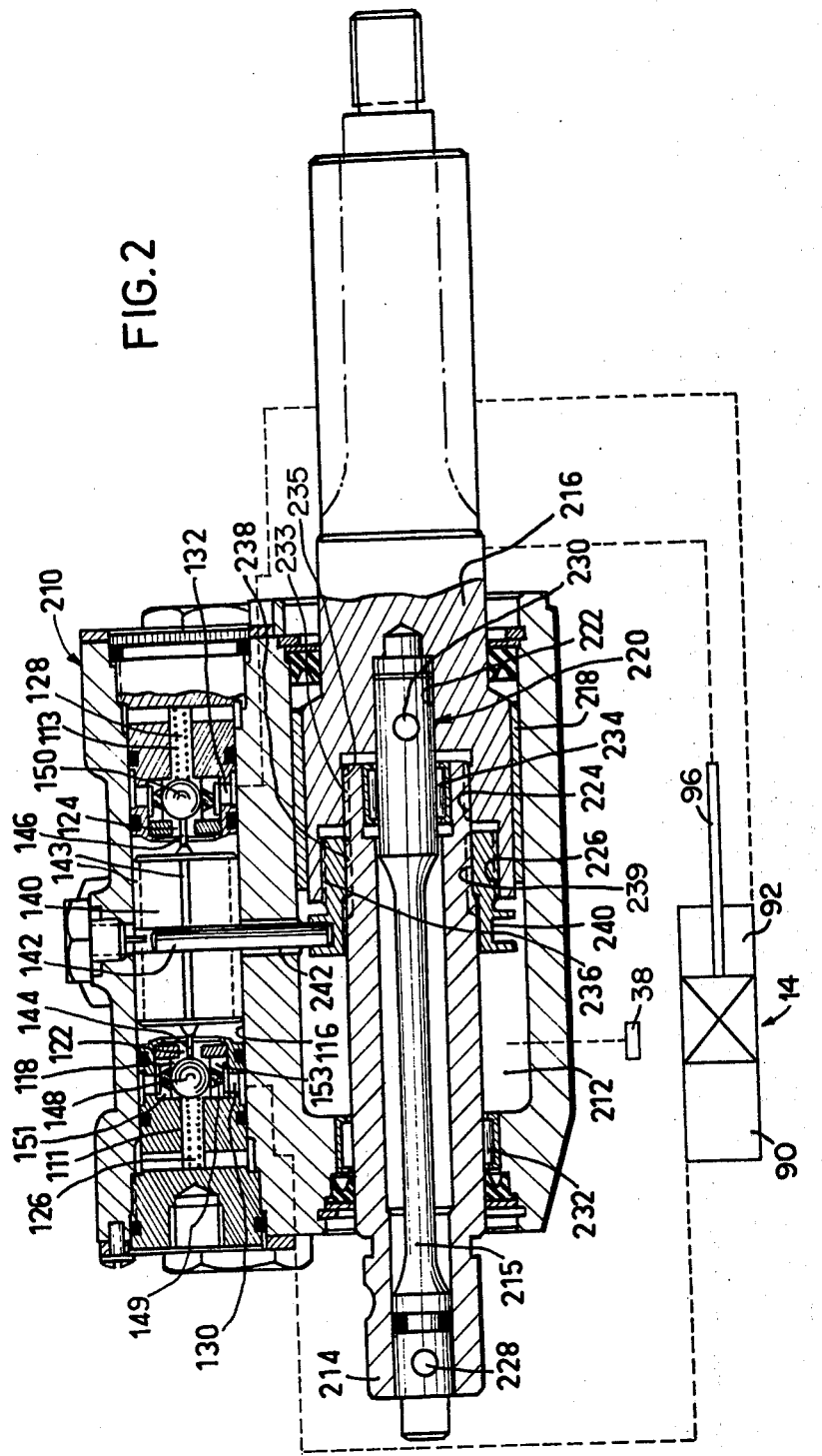
FIG. 2 is a view representing a cross-section of the distributor of the device shown in FIG. 1.

FIG. 1 diagrammatically illustrates a hydraulic power steering mechanism for a motor vehicle, consisting essentially of a distributor 10, a bypass valve 12 and a hydraulic actuator 14.

The distributor 10 contains a central bore 16 and two distribution chambers 18, 20 which form extensions of the central bore 16 and communicate therewith by passages 22, 24 respectively. Each distribution chamber also has an inlet passage 26, 28 respectively and a working passage 30, 32. A line connects the inlet passages 26, 28 to the high pressure orifice of a pressure source 34 which, in this embodiment, is a constant-delivery hydraulic pump.

The bore 16 communicates with a low pressure source 38 formed by a reservoir. A first piston 40 is housed in the bore 16, but fluid can flow between the passages 22, 24 and the reservoir 38 along longitudinal grooves in the piston 40, as will be described below.

A radial pin 42 is introduced into a radial passage in the piston 40 to control the longitudinal motion of the piston. The manner in which the pin 42 is operated will also be described below. The piston 40 also has an axial finger 44, 46 projecting respectively at each end of its faces. The axial fingers 44, 46 normally urge ball valve members 48, 50 respectively disposed in the distribution chambers 18, 20, off the valve seats defined in the passages 22, 24 respectively. When the piston 40 is in the idle position, the ball valve members 48, 50 are in positions enabling fluid to flow between each distribution chamber and both the high pressure source and the central bore 16. Consequently, the two outlet orifices 30, 32 deliver substantially identical average pressures to the chambers of the hydraulic actuator 14.

The bypass valve 12 comprises a second piston 60 in a bore 62 formed in the same housing as that of the distributor. Each end of the second piston 60 opens in a terminal chamber or reaction chamber 64, 66 respectively. The terminal chamber 64 communicates with the distribution chamber 18 and also with one of the chambers 90 of the fluid motor or hydraulic actuator 14; similarly, the terminal chamber 66 communicates with the distribution chamber 20 and also with the other chamber 92 of the fluid motor. A spring 68 located in the terminal chamber 64 biases the piston 60 to the right when considering the figure. Another spring 70 in the terminal chamber 66 biases the piston 60 to the left in the figure.

The piston 60 contains a central groove 71 normally disposed in the flow path of fluid provided between the pump 34 and a reservoir 72, so defining a first leakage section enabling fluid to leak through the line 36 which is in series with a line 74 and a line 76, the latter containing a restrictor 78. The piston also contains two lateral grooves 80, 82 near its ends, so that when the pressure difference between the two terminal chambers generates a force greater than the force of either spring 68, 70, a fluid communication between lines 74 and 76 is again allowed by way of one of the lateral grooves 80 or 82, after said communication has been temporarily interrupted when the outer surface situated between the central groove 71 and one of the above-mentioned lateral grooves was disposed in the fluid path between lines 74 and 76. It should be noted that the lateral grooves 80 and 82 define a second leakage section, and that the maximum value of the second leakage section is less than that of the first leakage section.

The fluid motor 14 comprises the two chambers 90, 92 already mentioned, which are separated by a piston 94. The piston 94 is connected in respect of linear motion to a rod 96 intended to transmit the power assisting force to the steering linkage assembly of the vehicle (not shown).

In FIG. 2, which represents a view in cross-section of a control system associated with the distributor shown in FIG. 1, elements like those in FIG. 1 bear the same reference numeral plus 100. The body 210 of a housing contains a cavity 212 which receives an input shaft 214 constituting the input member and connected to rotate with the steering column of the vehicle.

The cavity 212 communicates with the reservoir 38. A rack-pinion device 216 coaxial with the input shaft and constituting the output member enters the cavity 212 and is centered by means of a bush 218 fitted to the body 210, where it forms a plain bearing. The left-hand end of the pinion 216 contains a blind bore generally designated 220, said bore being stepped into three parts 222, 224 and 226 of small, medium and large internal diameter respectively. The input shaft 214 penetrates into the medium-diameter part 224 of the blind bore 220. A bore in the central portion of the input shaft contains a torsion bar 215 keyed to the input shaft 214 at 228 and to the output member 216 at 230. The torsion bar penetrates into the small-diameter part of the blind bore 220. The input shaft 214 and pinion 216 are thereby resiliently connected. A needle bearing 232 is provided between the body and the outer periphery of the input shaft to facilitate relative rotation therebetween. Another needle bearing 234 is situated between the torsion bar 215 and the inner periphery of the input shaft 214 in the medium-diameter part 224 of the stepped bore 220. The right-hand end of the input shaft 214 bears on its outer periphery, teeth 233 cooperating with corresponding internal teeth 235 in the medium-diameter part 224 of the stepped bore 220, for restricting relative displacement of the input shaft 214 and pinion 216. Preferably, some play is permitted between the teeth, but they are arranged so that a relative displacement between the input shaft and pinion is limited to a value for which the torsion bar is not stressed beyond its elastic limit.

The large-diameter part 226 of the blind hole 220 is internally threaded, and a sleeve 236 disposed coaxial to the input shaft 214, is screwed into the threaded part of the bore 220 and can enter into rotation and move longitudinally relative to the pinion 216.

Depending on the characteristics desired for the power steering device, the threaded portion of the bore may be designed to receive a single-thread or multi-thread screw formed on the outer periphery of the sleeve. In addition, longitudinal splines 238 are provided on the inner periphery of the sleeve 236 to cooperate with matching splines on the input shaft, so that the sleeve 236 and input shaft 214 can enter in relative axial motion but not relative rotation. The sleeve 236 has a groove 240 at its outer left periphery, said groove being capable of moving in front of a passage 242 in the housing. The passage 242 connects the cavity 212 to a bore 116 containing the piston 140. A radial pin 142 is inserted in the groove 240 and passes through the passage 242 with clearance, extending into a diametrical bore in the piston 140. The pin 142 connects the sleeve 236 and piston 140 in respect of linear motion, and the space between the walls of the passage 242 and the pin 142 permits slight displacement of the piston 140 in response to a control signal. A plug screwed into the upper part of the housing, terminates by a needle penetrating the diametrical bore in the piston 140, said needle ending close to the upper extremity of the pin for holding the latter in position. One end of the piston 140 ends in a finger or push rod 144 penetrating into a distribution chamber 118 to urge a ball valve member 148 off a valve seat formed in the passage 122. A spring 111 counteracting the push rod 144 urges the ball 148 off another valve seat formed in a passage 126 communicating with the high pressure source. Another spring 113 acts in the same way on the other ball 150 of the distributor. The ball 148 is guided by a central member 149, and channels 151, 153 in this central member communicate the pressure from the distribution chamber 118 to the associated fluid motor chamber 90 by way of the passage 130. Grooves 143 in the external periphery of the piston 140 allow fluid to flow from the distribution chambers to the cavity 212. The part of the distribution valve associated with the fluid motor chamber 92 will not be described in detail, since it is identical to the distribution valve associated with the chamber 90. The distributor associated with the distribution chamber operates as follows. When an operator imparts rotational force to the steering wheel, the steering column and the steering shaft 214 are also rotated. A reaction torque is then created in the torsion bar 215. The rotation of the input shaft 214 causes rotation of the sleeve 236 by way of the splines 238. The sleeve is then screwed or unscrewed in the large-diameter part 226 of the stepped blind hole 220 to move longitudinally along its axis of rotation by means of the splines 238. The direction of the sleeve's longitudinal movement depends on the direction of rotation of the input shaft 214. In this description, it will be assumed that the sleeve moves to the left in FIG. 2. The movement of the sleeve 236 to the left causes the piston 140 to be moved in the same direction by the radial pin 142. The push rod 144 formed by an axial finger then urges the valve member 148 off the valve seat defined in the passage 122 to increase the quantity of low-pressure fluid communicated to the distribution chamber 118. On the other hand, the valve member 148 is urged towards the valve seat defined in the passage 126 to reduce the quantity of high pressure fluid communicated to this distribution chamber. Consequently, the fluid pressure delivered by the passage 130 to the fluid motor chamber 90 decreases when the piston 140 is moved to the left. Simultaneously, the fluid pressure delivered by the passage 132 to the fluid motor chamber 92 increases. A pressure difference between the chambers of the fluid motor has been created to assist the manual steering controlled by the rack-pinion 216. If the piston is moved in the other direction, of course, the pressure difference between the fluid motor chambers will give rise to an assisting force in the opposite direction.

FIG. 3 illustrates an embodiment of the valve in a distribution chamber. Elements identical to those in FIG. 2 are represented by the same reference numerals with the exception of the push rod 144 and weak spring 111 which are not shown. Note that the central member 149 containing the grooves 151, 153 is trapped between two discs 155, 157, each of which contains a calibrated hole 159.

FIG. 4 represents a cross-section through an embodiment of the bypass valve, which is generally designated 12 in FIG. 1 and whose role will be explained in detail below. In FIG. 4, elements identical to those in FIG. 1 bear the same reference numeral plus 300. A passage 311 in a housing communicates with the high pressure source mentioned above and opens into a bore 362. A piston 360 is slidable in the bore 362 and contains a central groove 371, which is normally disposed on the fluid path of the passage 311 to define the first leakage section providing a fluid connection between this passage 311 and a reservoir 72 (not shown) when the piston 360 is in its idle position. Two lateral grooves 380, 382 are defined in the piston 360 on either side of the central groove 371, from which they are separated by respective bearing surfaces 379, 381. The lateral grooves 380, 382 in the piston 360 are intended to define the second leakage section between the passage 311 and reservoir 72, as mentioned above with reference to FIG. 1. Each end of the piston 360 penetrates into a respective terminal or reaction chamber 364, 366. Each reaction chamber 364, 366 communicates with an associated chamber in the fluid motor and also with a distribution chamber in the distributor by way of respective passages 331, 333. Plugs 315, 317 close the left and right-hand ends respectively of the bore 362. A spring 368 supported against the plug 315 biases a cup 321 of which an annular edge engages a shoulder in the terminal chamber 364. Similarly, another spring 370 bears on the plug 317 to urge a cup 325 identical to the cup 321 on to a shoulder in the terminal chamber 366. A weaker spring 327 in the chamber 364 extends into and is supported on the cup 321 and urges the piston 360 to the right in FIG. 4. Likewise, another weak spring 329 in the chamber 366 extends into and is supported against the cup 325, and this spring urges the piston 360 to the left in FIG. 4. The weak springs 327, 329 are provided to keep the piston 360 balanced in its idle position.

The bypass valve operates as follows. When the valve is idle, that is to say, when the steering wheel is stationary, the cross-sections of the fluid passages leading to the distribution chambers from the high pressure and low pressure sources are substantially identical for each distributor, since the ball valve members are equidistant from the valve seats formed in the passages connected to the high pressure. A substantially identical flow rate q of fluid passes through both distributors, and consequently the pressures supplied from each distribution chamber to the reaction chambers 364, 366 and also the associated fluid motor chambers are identical. Also, the central groove 371 in the piston 360 is situated on the leakage passage to define the first leakage section between the pump and the reservoir 338 (not shown), and so permits a certain leakage flow rate $q'$. The total flow rate from the pump is therefore $Q = 2q + q'$. Note also that the discharge of a quantity of fluid to the leakage passage when the distributor is in its idle position allows the pressure from the pump to be reduced, preventing dangerous heating of the liquid in the power steering circuit. Moreover, the leakage of fluid by way of the central groove 371 and restrictor 78 (not shown in FIG. 4) enables the sensitivity of the distributor to be modified when the values for the torque applied to the steering wheel are near zero, that is, when the central groove is on the leakage path. This has the result of reducing the abruptness of the valve's characteristic curve in the vicinity of zero and rendering it more rounded.

When slight rotary motion is transmitted to the input shaft, a pressure difference is created between the reaction chambers 364, 366 and also between the fluid motor chambers as explained above. Let us assume, for example, that the pressure in the chamber 364 increases whereas the pressure in the chamber 366 decreases. The force acting on the piston 360 and created by the difference between the pressures acting on the ends of the piston 360, causes the latter to move, counteracting the spring 329. The piston 360 penetrates progressively into the reaction chamber 366 in proportion to the increase in the pressure difference, eventually abutting on the cup 325. From this instant, the piston 360 is immobilized in this position, for the force acting on it is now insufficient to move the cup 325 off the shoulder in the chamber 366, overcoming the spring 370. During the movement of the piston 360 to the right, the surface 379 gradually covers the passage 311, interrupting the discharge of fluid through the leakage passage.

The characteristic curve of the power steering valve, which represents the absolute value for the pressure difference between the fluid motor chambers as a function of motion of the piston 140, this value being substantially proportional to the torque applied to the steering wheel, is substantially parabolic. When the pressure difference between the reaction chambers 364, 366, that is to say, between the chambers of the fluid motor, exceeds a predetermined value, the bypass valve shown in FIG. 4 can modify the gradient of the normal characteristic of the power steering valve. Indeed, if the pressure difference between the reaction chambers 364, 366 does become large enough to overcome the force of the spring 370, the piston 360 moves further into the reaction chamber 366, and the groove 380 gradually reveals the leakage passage between the pump and the reservoir 38 (not shown) again before reaching a limit position defining the second leakage section. This reduces the gradient of the substantially parabolic characteristic for high torque values. Note that the change in the gradient of the parabola occurs continuously, since the leakage caused by the groove 380 is progressive during the movement of the piston 360 to the right. Note also that in the embodiment shown in FIG. 4, the central groove is deeper than the lateral grooves, so that the ratio of the first to the second leakage section is of the order of 10.

The shape of the characteristic curve of the power steering valve could also be modified by changing the idle positions of the ball valve members relative to the associated valve seats. This can be done simply by altering the distance to which the distributors are screwed into the housing.

The main parameters which determine the characteristics of the valve are the cross-section of the valve seats, the idle positions of the ball valve members with respect to their corresponding valve seats, the depth of the central and lateral grooves, and the initial tension of the spring resting on the end plugs. In addition, the various assemblies making up the invention can be machined with relatively wide tolerances and can therefore be mass-produced. Thus, the manufacturing tolerances required for the holes in the discs and the depth of the end grooves are of the order of 50 to 100 microns, whereas, for example, the chamfers in the rotor of a rotary power steering valve must be machined to an accuracy of as little as 1 micron. Moreover, it is no longer necessary to use paired components, and each sub-assembly may be replaced in standard fashion without substantially modifying the characteristic of the valve.

It should be noted that the provision of restriction 78 disposed in the fluid line 76 is not compulsory, since in the rest position, fluid communication is already somewhat restricted by the central groove of the needle. However, it has appeared that such restriction is preferable and it has proved that the restriction permits to obtain an improved stability of the needle around its rest position.

It should also be noted that the invention is also applicable to a power steering device comprising a fluid motor having one chamber permanently submitted to the pressure delivered from the pump whereas the pressure in the other chamber is delivered by way of one distributor of the above type. This pressure is variable over and below an idle pressure corresponding to the zero position of the steering shaft. It is clear that, in this case, the needle or piston 360 should be of the differential type with its smaller end surface submitted to the pressure delivered from the pump in said one chamber and its larger end surface submitted to the pressure delivered to the other chamber by way of the distributor. Preferably, the ratio between the larger and smaller end surfaces of the piston is 2. Of course, in this embodiment, only one distributor is used for each fluid motor.

What I claim is:

1. Power steering mechanism comprising a housing defining a cavity and a bore, an input member extending into said cavity and adapted for rotation by an operator, an output member also extending into said cavity and disposed coaxial with the input member, said output member being provided for transmitting rotation which is applied to said input member, said input and output members being resiliently connected, a fluid motor cooperating with the output member for assisting the rotation of the output member in response to rotary motion of the input member, an intermediate sleeve disposed within the cavity and coaxial with the input and output members, said intermediate sleeve being movable relative to the input and output members along their axes of rotation in response to a rotation of the input member, distributing means carried in said housing bore and communicating with said fluid motor, said distributing means including a valve member within said housing bore and a control piston slidably mounted within said housing bore, said control piston operatively engaging said valve member and connecting with said intermediate sleeve, said control piston being responsive to the movement of said intermediate sleeve to move said valve member relative to the housing bore, thereby controlling the communication to said fluid motor via said valve member.

2. Power steering mechanism as claimed in claim 1, wherein said distributing means includes a distributing chamber which is provided with a first orifice connected to a high-pressure fluid source, a second orifice conneted to a low-pressure fluid source and a working orifice connected to the fluid motor associated with the distributing means, the valve member being normally held off valve seats respectively defined by the first and second orifices, said valve member being capable of moving towards one of the valve seats to move away from the other valve seat in response to the axial motion of the intermediate sleeve so as to increase or decrease the pressure delivered to said fluid motor by way of the working orifice, depending on the direction of the axial motion of the intermediate sleeve, said distributing chamber being disposed within the housing bore.

3. Power steering mechanism as claimed in claim 2, wherein the control piston is operatively connected to the intermediate sleeve, said piston being slidably mounted in the bore of said housing and comprising a pushrod projecting through the low-pressure orifice to urge the valve member off the valve seat defined in said low-pressure orifice, resilient means being provided in the distributing chamber for counteracting the action of said pushrod and simultaneously urging the valve member off the valve seat defined in the high-pressure orifice.

4. Power steering mechanism as claimed in claim 3, wherein said piston is connected to the intermediate sleeve by a connecting pin.

5. Power steering mechanism as claimed in claim 4, wherein said connecting pin has a first end entering a radial passage in the piston and a second end entering an annular groove in the intermediate sleeve, the pin having a central portion inserted with radial clearance in a passage of the housing connecting the cavity to said bore in the housing, to permit transmission to the control piston of the axial movements of the intermediate sleeve.

6. Power steering mechanism as claimed in claim 5, wherein the cavity is connected to the low-pressure source, said piston comprising grooves at its periphery for connecting the cavity to the low-pressure orifice.

7. Power steering mechanism as claimed in claim 6, wherein said distributing means includes two valve members and each end of the control piston is associated with one of the valve members, the position of said valve members determining the pressure in chambers of the fluid motor, so that that pressures communicated to the chambers vary in response to axial motion of the control piston.

8. Power steering mechanism as claimed in claim 1, wherein the intermediate sleeve is fixed by a screwed connection into a blind hole in the output member, the sleeve comprising a bore into which the input member is introduced, the sleeve being axially slidable relative to the input member and rotationally connected relative to the latter by splines on the input member which are disposed axially in the last named bore.

9. Power steering mechanism as claimed in claim 8, wherein the blind hole is stepped, the input member being introduced into one of the stepped portions of the blind hole, teeth defined in said one of the stepped portions of the blind hole cooperating with teeth of the facing peripheral surface of the input member for limiting relative displacement of the input and output members.

* * * * *